(12) United States Patent
Pagot et al.

(10) Patent No.: US 8,495,876 B2
(45) Date of Patent: Jul. 30, 2013

(54) TWO-STAGE SUPERCHARGING SYSTEM WITH EXHAUST GAS PURIFICATION DEVICE FOR INTERNAL-COMBUSTION ENGINE AND METHOD FOR CONTROLLING SAME

(75) Inventors: Alexandre Pagot, Rueil Malmaison (FR); Eric Watel, Arras (FR)

(73) Assignee: IFP, Rueil Malmaison Cedex (FR)

( * ) Notice: Subject to any disclaimer, the term of this patent is extended or adjusted under 35 U.S.C. 154(b) by 524 days.

(21) Appl. No.: 12/757,060

(22) Filed: Apr. 9, 2010

(65) Prior Publication Data
US 2010/0263372 A1    Oct. 21, 2010

(30) Foreign Application Priority Data
Apr. 16, 2009 (FR) ..................... 09 01861

(51) Int. Cl.
*F02B 33/44* (2006.01)
(52) U.S. Cl.
USPC .............. 60/612; 60/605.2; 60/299; 123/562; 123/568.15
(58) Field of Classification Search
USPC ............ 60/612, 605.2, 299; 123/562, 568.15
See application file for complete search history.

(56) References Cited

U.S. PATENT DOCUMENTS
7,975,478 B2 * 7/2011 Zielke et al. ................. 60/605.2

FOREIGN PATENT DOCUMENTS
WO    WO 2004097195 A1 * 11/2004
WO    WO 2008/155268 A1   12/2008

* cited by examiner

*Primary Examiner* — Ching Chang
(74) *Attorney, Agent, or Firm* — Antonelli, Terry, Stout & Kraus, LLP.

(57) ABSTRACT

The present invention relates to a two-stage supercharging system for an internal-combustion engine (10) comprising at least one cylinder (12) with an intake distributor (16) and an exhaust manifold (18), as well as a recirculation line (78) for recycling the exhaust gas to the intake of said engine, said system comprising a high-pressure supercharging stage (22) with a turbocharger including an expansion turbine (26) connected to a compressor (30) and a low-pressure supercharging stage (24) with a turbocharger including an expansion turbine (28) connected to a compressor (32), and exhaust gas purification means arranged between exhaust outlet (40) and turbine (26) of the high-pressure turbocharger.
According to the invention, the system comprises an exhaust gas bypass branch (70) going from outlet (40) of the engine exhaust and ending at turbine (28) of low-pressure turbocharger (24).

8 Claims, 2 Drawing Sheets

TWO-STAGE SUPERCHARGING SYSTEM WITH EXHAUST GAS PURIFICATION DEVICE FOR INTERNAL-COMBUSTION ENGINE AND METHOD FOR CONTROLLING SAME

FIELD OF THE INVENTION

The present invention relates to a two-stage supercharging system for an internal-combustion engine and to a method for controlling same.

It more particularly concerns the depollution treatment of exhaust gas from this type of engine.

As is generally admitted, the power generated by an internal-combustion engine depends on the amount of air fed into the combustion chamber of this engine. This air is mixed with fuel so as to achieve combustion of the mixture thus obtained.

Since this amount of air is itself proportional to the density of this air, if high power is required, an increase in this amount of air is provided by compression. This compression is generally performed before the air is allowed into this combustion chamber.

This operation, referred to as supercharging, is usually carried out by a compressor driven by a turbine scavenged by the exhaust gas of the engine, more commonly referred to as turbocharger.

BACKGROUND OF THE INVENTION

Document WO-2008/155,268 describes an internal-combustion engine with two supercharging stages, allowing to further increase compression of the air fed into the combustion chamber while improving the efficiency of this engine and reducing its fuel consumption.

More precisely, these two stages are arranged in series in relation to one another and they consist of two turbochargers, a high-pressure (HP) turbocharger and a low-pressure (LP) turbocharger. The HP turbocharger is more particularly suited for low flow rates whereas the LP turbocharger is suited for higher flow rates.

These turbochargers consist each of an expansion turbine connected by a drive shaft to a compressor. These two turbochargers are so laid out that the turbine of the HP turbocharger, supplied with the exhaust gas taken from the engine exhaust pipe, supplies in turn the turbine of the LP turbocharger while the compressor of the LP turbocharger supplies the compressor of the HP turbocharger.

As better described in the aforementioned document, a burnt gas recirculation circuit referred to as EGR circuit is provided. This circuit essentially comprises a line, referred to as EGR line, allowing exhaust gas to be introduced from a branch connection on the exhaust pipe of this engine (generally at the exhaust manifold outlet) to a connection point at the intake thereof (more precisely to the intake distributor).

This EGR circuit thus allows exhaust gas to be added to the fuel mixture, notably in order to decrease the production of nitrogen oxides (NOx) by reducing the combustion temperature of this mixture.

An additional gas purification means is also housed upstream from this EGR line and downstream from the exhaust. This purification means, referred to as precatalyst hereafter, adds further to the main exhaust gas purification device that all engines are usually equipped with in form of a catalyst.

In order to be able to treat the pollutants contained in the exhaust gas efficiently, this main catalyst, which is initially at ambient temperature, has to be heated by the exhaust gas flowing therethrough until it reaches a sufficient temperature level for its light-off.

In order to minimize the discharge of pollutants to the atmosphere, the precatalyst is intended to reach more rapidly its light-off temperature than the main catalyst considering that it is located closer to the exhaust outlet. This precatalyst thus allows part of the pollutants of these gases to be treated more rapidly.

More particularly, this precatalyst is advantageously an oxidation precatalyst allowing the HC (unburnt hydrocarbons) and the CO (carbon monoxide) contained in the exhaust gas to be treated.

However, this precatalyst, when traversed by high exhaust gas flow rates, generates a significant pressure drop with the major drawback of creating a back pressure that hinders discharge of the exhaust gas out of the engine cylinders.

In order to avoid this, and as better described in the aforementioned document, it is necessary for the precatalyst to be arranged downstream from the bypass line the HP turbine is fitted with, and which allows this turbine to be bypassed for gases with high flow rates.

No pressure drop is therefore created by this precatalyst when the LP turbocharger is used alone.

Another drawback lies in the fact that this precatalyst is not arranged in such a way that the recirculated exhaust gas is also purified prior to being fed again to the intake. This is all the more prejudicial since removal of the HC and CO contained in this gas allows, on the one hand, to facilitate load control and, on the other hand, to reduce fouling of the various parts of the engine scavenged by this recirculated exhaust gas.

The present invention aims to overcome the aforementioned drawbacks by means of a system that provides the same functionalities of the supercharging system while allowing the exhaust gas of the EGR circuit to be purified.

SUMMARY OF THE INVENTION

The invention therefore relates to a two-stage supercharging system for an internal-combustion engine comprising at least one cylinder with an intake distributor and an exhaust manifold, as well as a recirculation line for recycling the exhaust gas to the intake of said engine, said system comprising a high-supercharging stage with a turbocharger including an expansion turbine connected to a compressor and a low-pressure supercharging stage with a turbocharger including an expansion turbine connected to a compressor, and exhaust gas purification means arranged between the exhaust outlet and the turbine of the high-pressure turbocharger, characterized in that it comprises an exhaust gas bypass branch going from the outlet of the engine exhaust and ending at the turbine of the low-pressure turbocharger.

Advantageously, the bypass branch can comprise a throttle means.

Preferably, the throttle means can comprise a multi-position valve.

The bypass branch can end at a junction point on a line connecting the outlet of the high-pressure turbocharger turbine to the intake of the low-pressure turbocharger turbine.

The exhaust gas purification means can be located between the exhaust gas outlet and the exhaust gas recirculation line.

The invention also relates to a method of controlling a two-stage supercharging system for an internal-combustion engine comprising at least one cylinder with an intake distributor and an exhaust manifold, as well as a recirculation line for recycling the exhaust gas to the intake of said engine, said system comprising a high-pressure supercharging stage with a turbocharger including an expansion turbine connected to a compressor and a low-pressure supercharging stage with a turbocharger including an expansion turbine connected to a compressor, and exhaust gas purification means arranged between the exhaust outlet and the turbine of the high-pressure turbocharger, characterized in that it consists, for an engine operating mode, in sending, from the exhaust outlet, part of the exhaust gas to a bypass branch ending at the turbine of the low-pressure turbocharger and the other part of this exhaust gas to a line connected to the gas recirculation line.

The method can consist, for another engine operating mode, in preventing, from the exhaust outlet, circulation of the exhaust gas towards the bypass branch and in sending the exhaust gas to the line carrying this gas to the gas recirculation line and to the intake of the high-pressure turbocharger turbine.

The method can consist in sending the gas circulating in the line through the exhaust gas purification means.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
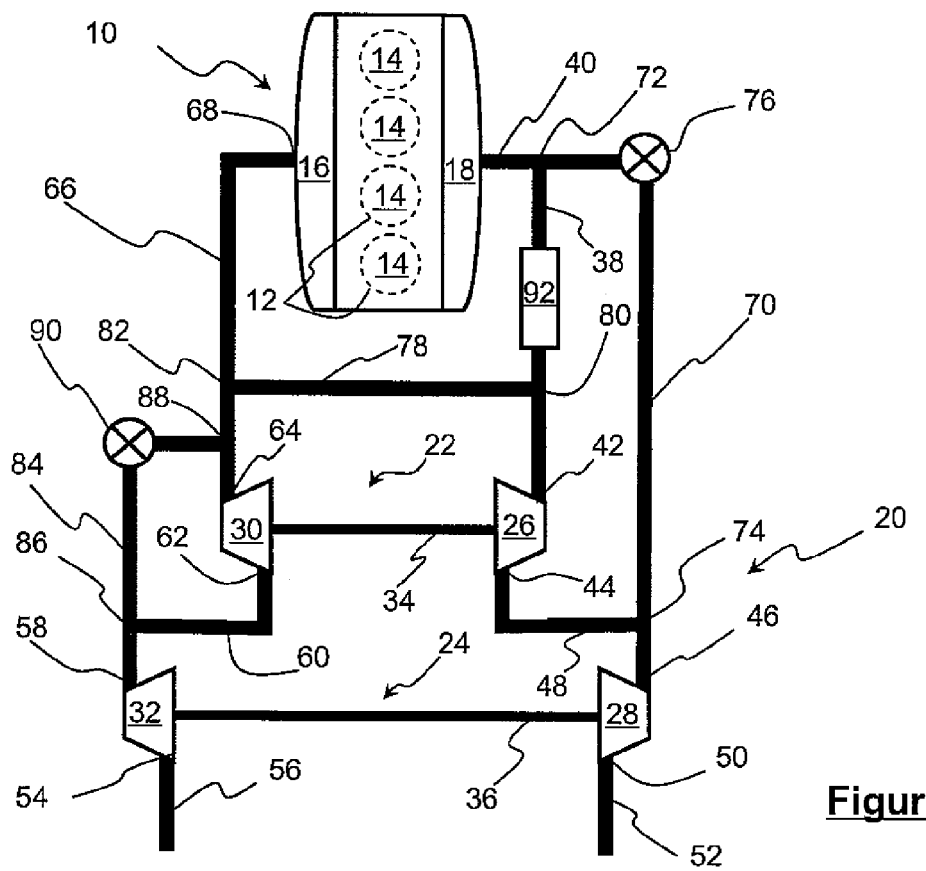
FIG. 1 illustrates a two-stage supercharging system with an additional exhaust gas purification device for an internal-combustion engine according to the invention.

In FIG. 1, internal-combustion engine 10, in particular a direct-injection engine, notably of diesel type, comprises at least one cylinder 12 with a combustion chamber 14 wherein combustion of a fuel mixture takes place. This engine also comprises an intake distributor 16 used for supplying a fluid required to achieve a fuel mixture in the combustion chambers. What is referred to as fluid here is a mixture of supercharged air and of recirculated exhaust gas. The exhaust gas resulting from the combustion of the fuel mixture contained in the combustion chambers is discharged to an exhaust manifold 18.

Supercharging system 20 comprises two turbocompression stages with a first stage consisting of a HP turbocharger 22 and a second stage consisting of a LP turbocharger 24.

Each turbocharger comprises a turbine 26, 28 driving into rotation a compressor 30, 32 by means of a shaft 34, 36.

The two turbochargers are arranged in such a way in relation to one another that expansion turbine 26 of HP turbocharger 22 (or HP turbine) can supply expansion turbine 28 of LP turbocharger 24 (or LP turbine) and that compressor 30 of the HP turbocharger (or HP compressor) can be supplied by compressor 32 of the LP turbocharger (or LP compressor).

As can be better seen in FIG. 1, an exhaust gas circulation line 38 connects outlet pipe 40 of exhaust manifold 18 to intake 42 of the HP turbine whose outlet 44 is connected to intake 46 of LP turbine 28 by an exhaust gas circulation line 48. Outlet 50 of the LP turbine is connected to exhaust line 52 that any engine is usually provided with. Generally, this line is fitted with a main exhaust gas purification means (not shown), such as a catalyst, notably a three-way catalyst.

Intake 54 of LP compressor 32 is supplied with an exterior fluid such as air through a supply line 56. Outlet 58 of the LP compressor is connected by an air circulation line 60 to intake 60 of HP air compressor 30, and outlet 64 of this compressor is connected by an air circulation line 66 to inlet 68 of intake distributor 16.

The terms "upstream" and "downstream" used in the description hereafter are employed with reference to the direction of circulation of the exhaust gas between exhaust manifold 18 and exhaust line 52, or to the direction of circulation of the fluid between supply line 56 and intake distributor 16.

An exhaust gas bypass branch 70 originates at a branch connection 72 upstream from HP turbine 26 at the intersection of line 38 and outlet pipe 40 of the manifold. This branch ends at a junction point 74 on line 48 between outlet 44 of the HP turbine and intake 46 of the LP turbine.

This branch comprises, between the branch connection and the junction point, a throttle means 76 allowing the exhaust gas circulation to be controlled. Advantageously, this throttle means is a multi-position valve between a fully open position of this branch and a fully closed position.

Of course, this valve is controlled by any means generally known to the person skilled in the art, under the control of the engine calculator of this engine.

A line 78 referred to as EGR (Exhaust Gas Recirculation) line allows the exhaust gas of the engine to be fed back to the intake thereof. More precisely, this line connects a connection point 80 on line 38, upstream from HP turbine 26 and downstream from branch connection 72, to another connection point 82 of line 66.

This exhaust gas recirculation to the engine intake is conventionally used to reduce emissions of some pollutants such as nitrogen oxides (NOx) that are discharged upon combustion of the fuel mixture.

Of course, as it is widely known, this EGR line can carry a heat exchanger allowing the exhaust gas flowing therethrough to be cooled, as well as a valve, commonly known as EGR valve, allowing to control circulation of the exhaust gas in this EGR line.

The HP compression stage comprises a short-circuit line 4 of HP compressor 30. This line starts from an upstream point 86 of line 60 between the HP and LP compressors and it ends at a downstream point 88 between outlet 64 of the HP compressor and connection point 82 of the EGR line. This line carries, between the upstream and downstream points, a throttle means 90 allowing the air circulation to be controlled.

An additional exhaust gas purification means 92, referred to as precatalyst in the description hereafter, is arranged on line 38 between connection point 80 of the EGR line and branch connection 72 with branch 70.

This precatalyst is usually a porous body traversed by the exhaust gas and it comprises catalytic phases allowing to react some of the exhaust gas pollutants with these catalytic phases.

Preferably, this precatalyst is arranged as close as possible to exhaust gas outlet 40 so as to benefit to the maximum from the heat contained in this gas. This precatalyst thus warms up more rapidly and it reaches its light-off temperature faster.

Advantageously, this precatalyst is intended to treat notably the HC and the CO contained in the exhaust gas.

Figure 2:
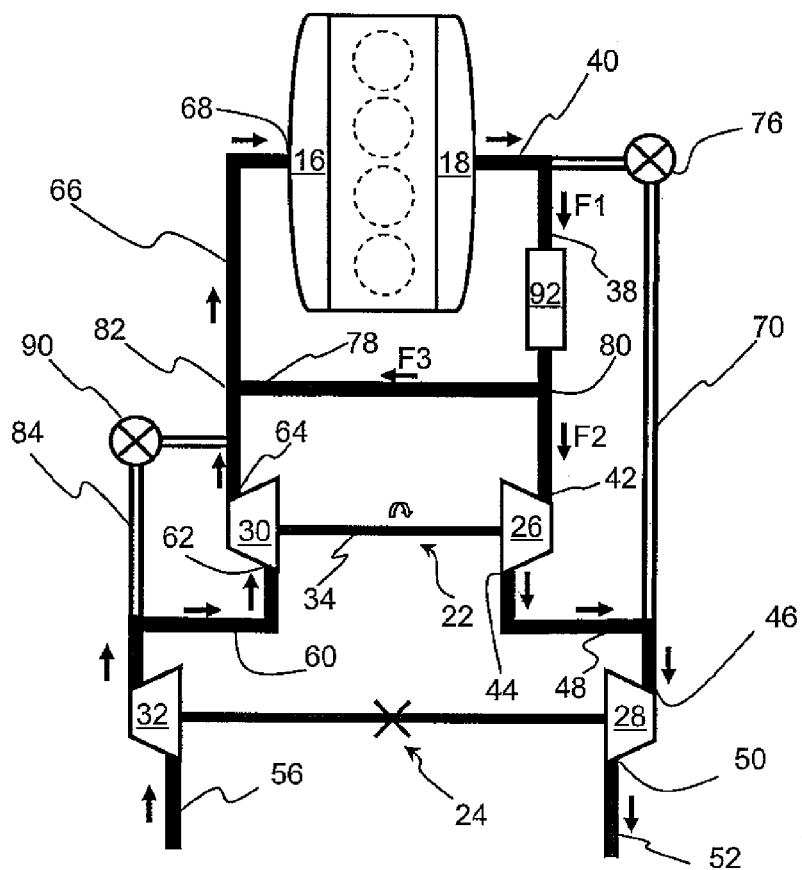
FIG. 2 shows the engine of FIG. 1 according to a first operating configuration.

For the operating mode where the exhaust gas flow rate is compatible with the use of HP turbocharger 22, as in the engine idle or low load phases, valve 76 is controlled in a fully closed position of branch 70, thus preventing any exhaust gas circulation therein, as illustrated in FIG. 2. Similarly, valve 90 is controlled in closed position so as to prevent any air circulation in short-circuit line 84.

The exhaust gas coming from outlet pipe 40 of manifold 18 circulates in line 38 (arrow F1) and flows through precatalyst 92. This precatalyst treats the HC and CO pollutants contained in the gas by eliminating a very large part of this gas.

The treated gas then reaches connection point 80 where it divides into two streams, a first stream F2 sent to HP turbine 26 and a second stream F3 sent to EGR line 78 for recirculation of the exhaust gas to the engine intake.

Exhaust gas stream F2 reaches intake 42 of HP turbine 26 with such a pressure and energy that the gas drives into rotation the rotor this turbine is equipped with. This gas is then discharged from the turbine through outlet 44 and it circulates in line 48 through which it is carried to intake 46 of LP turbine 2S. The gas is then discharged into exhaust line 52 through outlet 50 of the LP turbine.

For description simplification reasons, one considers that, in the example of FIG. 2, the energy of the exhaust gas flowing through the LP turbine does not allow rotation of this turbine. The LP compressor is therefore not driven into rotation by drive shaft 36.

The fresh air flowing in through supply line 56 at intake 54 of LP compressor 32 flows through this compressor and it reaches the outlet thereof at a pressure close to its pressure at the intake (generally atmospheric pressure). This air is then allowed into intake 62 of HP compressor 30 whose rotor is driven into rotation by drive shaft 34 connected to HP turbine 26. Through this rotation, the air is compressed and it is discharged, in compressed form, through outlet 64 from where it reaches connection point 82. From this point, this compressed air mixes with exhaust gas stream F3 circulating in EGR line 78. The mixture of compressed air and of exhaust gas is then sent through line 66 to inlet 68 of intake distributor 16 so as to eventually obtain a fuel mixture capable of burning in combustion chambers 14.

Since the precatalyst is active very early—thanks to its composition and to its position, very close to the exhaust outlet—, stream F3 consisting of the exhaust gas mixed with the compressed air and recirculated to the intake is freed of a large part of its pollutants. Similarly, exhaust gas stream F2 is depolluted and reaches outlet 50 of the LP turbine purified. Thus, even though the main depollution means arranged on exhaust line 52 are not operational, the exhaust gas discharged to the atmosphere is depolluted for the most part.

Of course, the person skilled in the art will take all the required steps to configure HP turbocharger 22 in such a way that it is fully active for the amount of energy of the exhaust gas coming from the engine running under idle or low load conditions.

Figure 3:
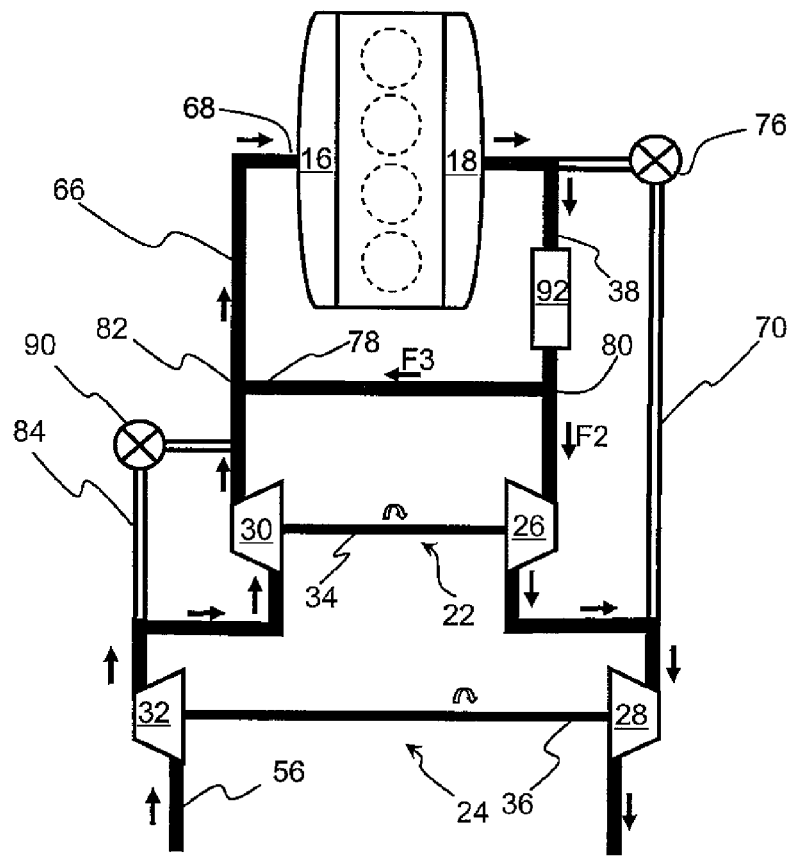
FIG. 3 shows the engine of FIG. 1 according to a second operating configuration.

For operation under engine medium load conditions (FIG. 3), the configuration is identical to that of FIG. 2 with valve 76 for branch 70 and valve 90 for short-circuit line 84 kept in closed position.

Under such operating conditions, the pressure and the energy of the exhaust gas are increased in relation to those of the mode of FIG. 2. Exhaust gas stream F2 flows through HP turbine 26 and drives into rotation the rotor of this turbine. This gas is then discharged from the HP turbine and it reaches LP turbine 28 with sufficient exhaust gas pressure and energy to drive into rotation the rotor of this LP turbine.

Thus, exhaust gas stream F2 allows rotation of the two turbines 26 and 28 which, in turn, drive into rotation the two compressors 30 and 32 by means of drive shafts 34 and 36.

The fresh air flowing in through line 56 flows through LP compressor 32 while being compressed to a first level (of the order of some hundred millibars above atmospheric pressure). This compressed air is then allowed into HP compressor 30 which it leaves in compressed state with a higher pressure than at the outlet of LP compressor 32.

The compressed air leaving the HP compressor reaches connection point 82 where it mixes with exhaust gas stream F3 circulating in EGR line 78. The mixture of compressed air and of exhaust gas is then sent through line 66 to inlet 68 of intake distributor 16 so as to eventually obtain a fuel mixture capable of burning in combustion chambers 14.

Similarly, as described above, the exhaust gas mixed with compressed air and recirculated to the intake, as well as the exhaust gas discharged to the atmosphere through the exhaust line, are freed of a large part of the pollutants they contained.

Figure 4:
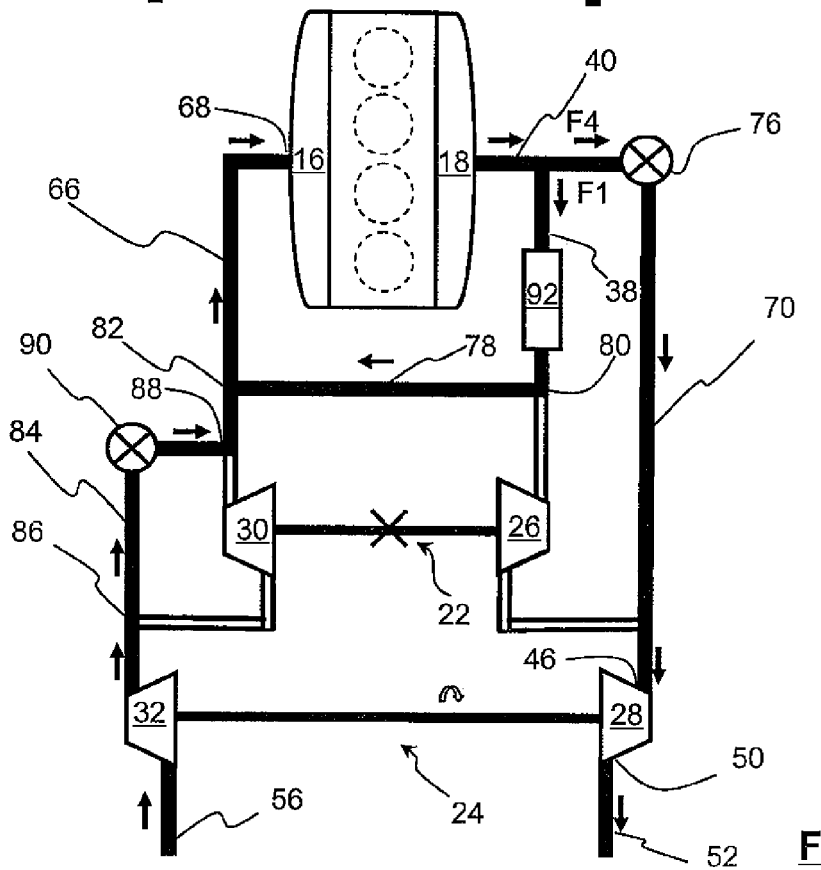
FIG. 4 shows the engine of FIG. 1 according to a third operating configuration.

For operation at higher loads, as illustrated in FIG. 4, valve 76 is in fully open position of bypass branch 70 and valve 90 allows air circulation in short-circuit line 84 of LP compressor 32.

The exhaust gas discharged from manifold 18 preferably follows the high-permeability circuit. More precisely, this gas flows into bypass branch 70, thus bypassing HP turbine 26. Only LP turbine 28 is therefore driven into rotation by the exhaust gas, thus making HP turbocharger 22 inoperative. Similarly, as it is generally the case, the pressure difference between the intake and the exhaust promotes the development of a gas flow from the exhaust to the intake and the exhaust gas follows line 38 in order to be recirculated to the engine intake.

Thus, in this configuration, the exhaust gas divides, from outlet 40, into two streams of different capacities, a low-capacity stream F1 sent to precatalyst 92 and a high-capacity stream F4 sent to bypass branch 70.

Stream F4 reaches intake 46 of LP turbine 28 while driving its rotor into rotation. This gas is then discharged into exhaust line 52 through outlet 50 of the LP turbine. Since the main purification device arranged on exhaust line 52 has reached its light-off temperature, the exhaust gas is treated prior to being discharged to the atmosphere.

Stream F1 flows through precatalyst 92, reaches connection point 80 and circulates in EGR line 78 up to the other connection point 82.

The fresh air thus flows in through supply line 56 and it flows through LP compressor 32 where it is compressed and which it leaves at a high pressure prior to reaching upstream point 86 of line 84. This compressed air circulates in line 84 and reaches downstream point 88 on line 66. The compressed air then reaches connection point 82 where it mixes with the exhaust gas stream circulating in EGR line 78.

As mentioned above, the mixture of compressed air and of exhaust gas is then sent through line 66 to inlet 68 of intake distributor 16 so as to obtain the fuel mixture that burns in combustion chambers 14.

Thanks to this layout, the stream of exhaust gas mixed with compressed air and recirculated to the intake is freed of a large part of its pollutants by precatalyst 84, whatever the engine operating mode.

The present invention is not limited to the example described and it encompasses any variant or equivalent covered by the present invention.

The invention claimed is:

1. A two-stage supercharging system for an internal-combustion engine comprising at least one cylinder with an intake distributor and an exhaust manifold, as well as an exhaust gas recirculation line for recycling the exhaust gas to the intake of the engine, the system comprising a high-pressure supercharging stage with a turbocharger including an expansion turbine connected to a compressor and a low-pressure supercharging stage with a turbocharger including and expansion turbine connected to a compressor, and exhaust gas purification means arranged between an exhaust gas outlet of the engine exhaust manifold and the turbine of the high-pressure turbocharger characterized in that the system comprises an exhaust gas bypass branch going from the exhaust gas outlet of the engine exhaust manifold and ending at the turbine of low-pressure turbocharger, and characterized in that the exhaust gas purification means is arranged between the exhaust gas outlet of the engine exhaust manifold and the exhaust gas recirculation line.

2. A supercharging system as claimed in claim 1, characterized in that the exhaust gas bypass branch comprises a throttle means allowing control of exhaust gas circulation.

3. A supercharging system as claimed in claim 2, characterized in that the throttle means comprises a multi-position valve.

4. A supercharging system as claimed in claim 1, characterized in that bypass branch ends at a junction point on a line connecting an outlet of the turbine of the high-pressure turbocharger to an intake of the turbine of the low-pressure turbocharger.

5. A two-stage supercharging system for an internal-combustion engine comprising:
- an engine including at least one cylinder, an intake distributor, and an exhaust manifold;
- an exhaust gas recirculation line for recycling exhaust gas to an inlet of the intake distributor;
- a high-pressure supercharging stage with a turbocharger including an expansion turbine connected to a compressor;
- a low-pressure supercharging stage with a turbocharger including an expansion turbine connected to a compressor;
- an exhaust gas purification means arranged between an exhaust gas outlet of the exhaust manifold and the turbine of the high-pressure supercharging stage, the exhaust gas purification means being arranged between the exhaust gas outlet of the exhaust manifold and the exhaust gas recirculation line; and
- an exhaust gas bypass branch extending from the exhaust gas outlet of the exhaust manifold to the turbine of the low-pressure supercharging stage.

6. A supercharging system as claimed in claim 5, wherein The exhaust gas bypass branch comprises a throttle means allowing control of exhaust gas circulation.

7. A supercharging system as claimed in claim 6, wherein the throttle means comprises a multi-position valve.

8. A supercharging system as claimed in claim 5, wherein The exhaust gas bypass branch ends at a junction point on a line connecting an outlet of the turbine of the high-pressure supercharging stage to an intake of the turbine of the low-pressure supercharging stage.

* * * * *